US011142916B2

(12) United States Patent
LePoire et al.

(10) Patent No.: US 11,142,916 B2
(45) Date of Patent: Oct. 12, 2021

(54) ANCHOR FOR A CONCRETE FLOOR

(71) Applicant: Columbia Insurance Company, Omaha, NE (US)

(72) Inventors: Robert A. LePoire, St. Albans, MO (US); David C. Wert, Pacific, MO (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 0 days.

(21) Appl. No.: 16/720,074

(22) Filed: Dec. 19, 2019

(65) Prior Publication Data

US 2020/0199891 A1 Jun. 25, 2020

Related U.S. Application Data

(60) Provisional application No. 62/782,207, filed on Dec. 19, 2018.

(51) Int. Cl.
*E04F 15/08* (2006.01)
*E04B 1/41* (2006.01)

(52) U.S. Cl.
CPC .............. *E04F 15/082* (2013.01); *E04B 1/41* (2013.01)

(58) Field of Classification Search
CPC .. E04B 1/41; E04B 1/49; E04F 15/082; E04F 15/085; E04F 15/12

(Continued)

(56) References Cited

U.S. PATENT DOCUMENTS

| 783,470 | A | * | 2/1905 | Schreck | .................... | E04B 1/41 52/714 |
| 1,779,885 | A | | 10/1930 | Lucy | | |

(Continued)

FOREIGN PATENT DOCUMENTS

| DE | 1006137 | B | * | 4/1957 | ............... | E04B 1/41 |
| EP | 0039931 | A2 | * | 11/1981 | ............... | E04B 5/36 |

(Continued)

OTHER PUBLICATIONS

International Search Report and Written Opinion issued for PCT/US2019/067318, dated Apr. 27, 2020, 16 pages.

(Continued)

*Primary Examiner* — Patrick J Maestri
*Assistant Examiner* — Joseph J. Sadlon
(74) *Attorney, Agent, or Firm* — Stinson LLP

(57) ABSTRACT

An anchor for connecting a concrete layer of a floor to a cellulosic layer of the floor, the cellulosic layer comprising a plurality of cellulosic members joined together in a side-by-side arrangement, the anchor including a first portion to extend between two adjacent cellulosic members of the cellulosic layer into the concrete layer of the floor. The first portion includes attachment structure to attach the first portion to one of the two adjacent cellulosic members of the cellulosic layer to attach the anchor to the cellulosic layer. An upper edge margin of the first portion is disposed within the concrete layer when the first portion is attached to the cellulosic layer. A second portion extends from the upper edge margin in a first direction that is transverse to the first portion. The second portion is spaced apart from the cellulosic layer and embedded within the concrete layer of the floor to attach the anchor to the concrete layer.

18 Claims, 9 Drawing Sheets

(58) Field of Classification Search
USPC .......................................................... 52/414
See application file for complete search history.

(56) References Cited

U.S. PATENT DOCUMENTS

| | | | |
|---|---|---|---|
| 1,833,998 A | 12/1931 | Kinninger | |
| 1,837,930 A * | 12/1931 | Waite | F16L 3/00 |
| | | | 248/58 |
| 1,939,007 A * | 12/1933 | Heltzel | E01C 19/504 |
| | | | 264/31 |
| 1,986,030 A * | 1/1935 | Tonn | E04B 5/10 |
| | | | 52/489.2 |
| 2,303,544 A * | 12/1942 | Goss | E04B 1/41 |
| | | | 52/714 |
| 2,831,222 A | 4/1958 | Anderson | |
| 3,045,294 A | 7/1962 | Livezey, Jr. | |
| 3,087,206 A | 4/1963 | Delf et al. | |
| 3,234,692 A * | 2/1966 | Bierlich | E04F 13/0862 |
| | | | 52/392 |
| 3,359,701 A * | 12/1967 | Schneller | E04B 1/41 |
| | | | 52/712 |
| 3,577,694 A | 5/1971 | Omholt | |
| 3,600,868 A | 8/1971 | Wilson, Jr. et al. | |
| 3,680,823 A * | 8/1972 | Lougheed | E04G 13/00 |
| | | | 249/3 |
| 3,802,147 A * | 4/1974 | O'Konski | E04B 5/40 |
| | | | 52/630 |
| 3,810,342 A * | 5/1974 | Scott | E04B 1/1909 |
| | | | 403/173 |
| 3,823,522 A | 7/1974 | Jureit et al. | |
| 3,939,618 A * | 2/1976 | Murphy | E02D 27/01 |
| | | | 52/274 |
| 3,953,015 A | 4/1976 | Taylor et al. | |
| D251,542 S | 4/1979 | Ozvath et al. | |
| 4,211,048 A | 7/1980 | Naka | |
| 4,297,048 A | 10/1981 | Jureit et al. | |
| 4,606,156 A * | 8/1986 | Sweers | E04F 15/02429 |
| | | | 52/126.6 |
| 4,616,462 A | 10/1986 | Abendroth | |
| 4,637,194 A * | 1/1987 | Knowles | E04C 3/14 |
| | | | 411/457 |
| 4,662,140 A * | 5/1987 | Porter | E04F 13/0885 |
| | | | 52/385 |
| 4,738,071 A | 4/1988 | Ezard | |
| 4,831,808 A | 5/1989 | Wynar | |
| 4,856,250 A | 8/1989 | Gronau et al. | |
| 4,909,007 A * | 3/1990 | Bodnar | E04B 5/04 |
| | | | 52/356 |
| 4,951,439 A * | 8/1990 | Floros | E04B 1/41 |
| | | | 52/351 |
| D323,105 S * | 1/1992 | Paul | D8/382 |
| 5,111,627 A * | 5/1992 | Brown | E04F 15/024 |
| | | | 52/126.5 |
| D331,006 S * | 11/1992 | Dziedzic | D8/354 |
| 5,197,596 A * | 3/1993 | Garganese | A47F 7/02 |
| | | | 206/486 |
| 5,299,403 A * | 4/1994 | Fentz | E04B 1/7629 |
| | | | 52/379 |
| 5,369,927 A | 12/1994 | Counihan | |
| 5,414,972 A * | 5/1995 | Ruiz | E04B 5/29 |
| | | | 52/335 |
| D362,174 S | 9/1995 | Sachs | |
| 5,526,629 A * | 6/1996 | Cavaness | E04C 2/384 |
| | | | 264/263 |
| 5,598,676 A * | 2/1997 | Chaves | E04B 5/43 |
| | | | 126/500 |
| 5,729,945 A * | 3/1998 | Menchetti | E04B 2/7453 |
| | | | 52/281 |
| 5,732,524 A * | 3/1998 | Kalker, Jr. | F16B 9/058 |
| | | | 52/712 |
| D394,377 S | 5/1998 | Najewski et al. | |
| 5,778,621 A | 7/1998 | Randjelovic | |
| D407,010 S * | 3/1999 | Sobczynski | D8/354 |
| 6,085,452 A | 7/2000 | Jalla | |
| 6,088,986 A * | 7/2000 | DiGate | E04G 23/0207 |
| | | | 52/514 |
| 6,199,309 B1 * | 3/2001 | Markarian | G08B 13/2434 |
| | | | 206/6.1 |
| 6,209,277 B1 * | 4/2001 | DiGate | E04F 13/0841 |
| | | | 52/514 |
| 6,213,679 B1 * | 4/2001 | Frobosilo | E04B 2/82 |
| | | | 403/403 |
| 6,378,828 B1 | 4/2002 | Valiulis et al. | |
| 6,513,290 B2 | 2/2003 | Leek | |
| 6,581,346 B2 * | 6/2003 | Melland | E04B 5/23 |
| | | | 52/334 |
| 6,588,169 B2 * | 7/2003 | Sarver | E04B 1/41 |
| | | | 24/16 R |
| 6,708,459 B2 * | 3/2004 | Bodnar | E04C 2/384 |
| | | | 52/335 |
| 6,718,698 B1 * | 4/2004 | Thompson | E04B 7/045 |
| | | | 403/403 |
| 7,024,833 B1 * | 4/2006 | Rice | E04B 2/8647 |
| | | | 52/426 |
| 7,296,386 B2 | 11/2007 | Leek | |
| D589,334 S | 3/2009 | Hotchkiss, III | |
| 7,730,691 B2 * | 6/2010 | Patrick | E04G 23/0203 |
| | | | 52/514 |
| 7,757,454 B2 * | 7/2010 | Smith | E04C 2/384 |
| | | | 52/601 |
| 7,823,350 B2 * | 11/2010 | Valle | E04C 5/04 |
| | | | 52/356 |
| D644,503 S | 9/2011 | Crane et al. | |
| 8,011,147 B2 * | 9/2011 | Hanlan | E04B 5/04 |
| | | | 52/252 |
| 8,074,414 B2 * | 12/2011 | Carrion | E04C 5/162 |
| | | | 52/236.3 |
| 8,082,701 B1 | 12/2011 | Wendel | |
| D663,190 S | 7/2012 | Mota et al. | |
| 8,297,017 B2 * | 10/2012 | Platt | E04C 3/293 |
| | | | 52/319 |
| 8,516,762 B1 * | 8/2013 | Jendusa | E04C 3/09 |
| | | | 52/414 |
| 8,615,942 B2 * | 12/2013 | Lafreniere | E04B 2/766 |
| | | | 52/204.2 |
| 8,863,477 B2 * | 10/2014 | Stal | E04B 1/24 |
| | | | 52/846 |
| D732,929 S | 6/2015 | Harrow | |
| 9,068,364 B2 * | 6/2015 | Troudt | E04G 9/08 |
| 9,091,065 B2 * | 7/2015 | Tran | B32B 3/06 |
| D742,728 S | 11/2015 | Ostler | |
| 9,175,705 B1 | 11/2015 | Clark, Jr. et al. | |
| D753,638 S | 4/2016 | Tatem et al. | |
| D768,469 S | 10/2016 | Bengtsson | |
| 9,636,886 B2 * | 5/2017 | Karle | B32B 3/06 |
| 9,938,709 B2 | 4/2018 | Daudet et al. | |
| D817,149 S * | 5/2018 | Ralph | E04B 1/167 |
| D818,363 S | 5/2018 | Kovacs | |
| 9,988,813 B2 * | 6/2018 | Tallarida | E04B 1/167 |
| 10,077,551 B2 * | 9/2018 | Parkes | E04B 1/483 |
| D876,203 S | 2/2020 | Riner | |
| 10,550,565 B2 * | 2/2020 | Heatly | E01C 19/504 |
| | | | 264/31 |
| 10,662,642 B2 * | 5/2020 | Hansort | E04G 9/08 |
| 2002/0194831 A1 | 12/2002 | Mead | |
| 2003/0126820 A1 | 7/2003 | Callahan et al. | |
| 2003/0172608 A1 | 9/2003 | Chambers | |
| 2004/0074183 A1 | 4/2004 | Schneider, III et al. | |
| 2010/0269445 A1 | 10/2010 | Gannon et al. | |
| 2011/0258828 A1 | 10/2011 | Moss, Jr. et al. | |
| 2015/0047278 A1 * | 2/2015 | Blount | E04F 15/08 |
| | | | 52/223.6 |
| 2015/0096242 A1 | 4/2015 | Lin | |
| 2015/0264823 A1 | 9/2015 | Shirley et al. | |
| 2017/0051499 A1 | 2/2017 | Wert et al. | |
| 2017/0130755 A1 | 5/2017 | Muhn et al. | |
| 2017/0150831 A1 | 6/2017 | Kovacs | |
| 2018/0066424 A1 | 3/2018 | Daudet | |
| 2018/0066425 A1 | 3/2018 | Ralph et al. | |

(56) References Cited

U.S. PATENT DOCUMENTS

| | | |
|---|---|---|
| 2018/0163392 A1 | 6/2018 | Spampatti et al. |
| 2019/0071878 A1 | 3/2019 | Lindberg |
| 2019/0242141 A1 | 8/2019 | Dye et al. |

FOREIGN PATENT DOCUMENTS

| | | | |
|---|---|---|---|
| EP | 1467038 A1 * | 10/2004 | ............... E04B 2/94 |
| FR | 2584758 A1 * | 1/1987 | ............. E04C 2/386 |
| FR | 2584758 A1 | 1/1987 | |
| GB | 2 078 817 A | 1/1982 | |

OTHER PUBLICATIONS

MiTek, Posi-joist Concrete System Installation Details, www.mii.com, pp. 7, at least as early as Mar. 19, 2019.
MiTek, Posi-joist Concrete System Schematic Drawing 1, pp. 1, at least as early as Mar. 19, 2019.
MiTek, Posi-joist Concrete System Schematic Drawing 2 pp. 1, at least as early as Mar. 19, 2019.
Mira, Posi-joist Concrete System Schematic Drawing 3, pp. 1, at least as early as Mar. 19, 2019.

\* cited by examiner

ANCHOR FOR A CONCRETE FLOOR

CROSS-REFERENCE TO RELATED APPLICATIONS

This application claims priority to U.S. Provisional Application No. 62/782,207, filed on Dec. 19, 2018, the entirety of which is hereby incorporated by reference.

FIELD

The present invention generally relates to concrete floors, and more specifically, to an anchor connecting a concrete floor to a sub-floor.

BACKGROUND

The use of concrete floors in the building of structures is commonplace. One such concrete floor is a corrugated steel concrete floor, where concrete is poured over a corrugated steel deck supported by the building. The corrugated steel deck must be thick enough in order to support the poured concrete, which adds significant weight to the floor that must be supported by the structure of the building.

SUMMARY

In one aspect, an anchor for connecting a concrete layer of a floor to a cellulosic layer of the floor, the cellulosic layer comprising a plurality of cellulosic members joined together in a side-by-side arrangement, comprises a first portion having opposite upper and lower edge margins. The first portion is configured to extend between two adjacent cellulosic members of the plurality of cellulosic members of the cellulosic layer into the concrete layer of the floor. The first portion includes attachment structure configured to attach the first portion to one of the two adjacent cellulosic members of the cellulosic layer to attach the anchor to the cellulosic layer. The upper edge margin of the first portion is configured to be disposed within the concrete layer when the first portion is attached to the cellulosic layer. A second portion extends from the upper edge margin in a first direction that is transverse to the first portion. The second portion is configured to be spaced apart from the cellulosic layer and embedded within the concrete layer of the floor to attach the anchor to the concrete layer.

In another aspect, a method of making an anchor that connects a concrete layer of a floor to a cellulosic layer of the floor, the cellulosic layer comprising a plurality of cellulosic members joined together in a side-by-side arrangement, generally comprises cutting an anchor blank from a sheet of material. The method including forming a first portion from the anchor blank. The first portion has opposite upper and lower edge margins and is configured to extend between two adjacent cellulosic members of the plurality of cellulosic members of the cellulosic layer into the concrete layer of the floor. The method including forming an attachment structure on the first portion. The attachment structure is configured to attach the first portion to one of the two adjacent cellulosic members of the cellulosic layer to attach the anchor to the cellulosic layer. The upper edge margin of the first portion is configured to be disposed within the concrete layer when the first portion is attached to the cellulosic layer. The method including forming a second portion from the anchor blank. The second portion extends from the upper edge margin in a first direction that is transverse to the first portion. The second portion is configured to be spaced apart from the cellulosic layer and embedded within the concrete layer of the floor to attach the anchor to the concrete layer.

Other features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
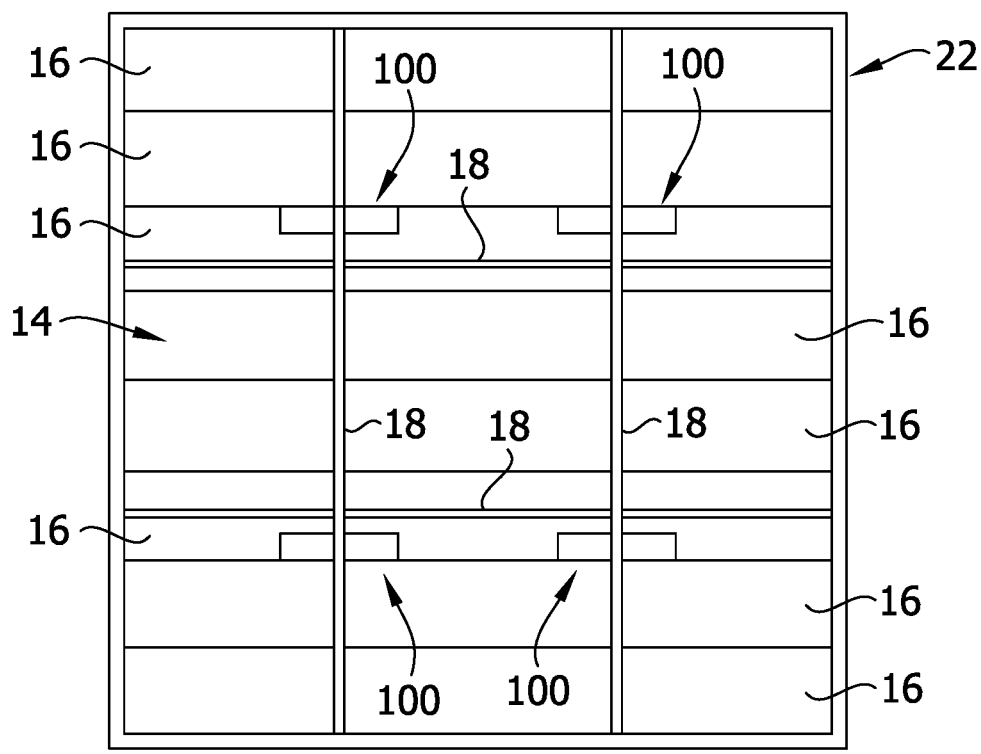
FIG. 1 is a top view of a plurality of anchors according to one embodiment of the present disclosure attached to a wooden sub-floor with a concrete form positioned over the wooden sub-floor.
Figure 1A:
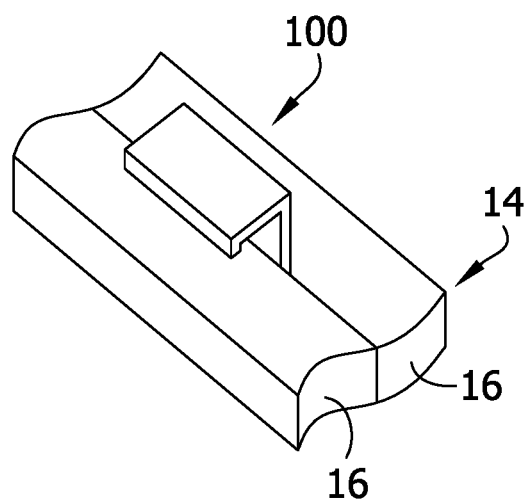
FIG. 1A is a fragmentary perspective showing the anchor attached to the wooden sub-floor.
Figure 2:
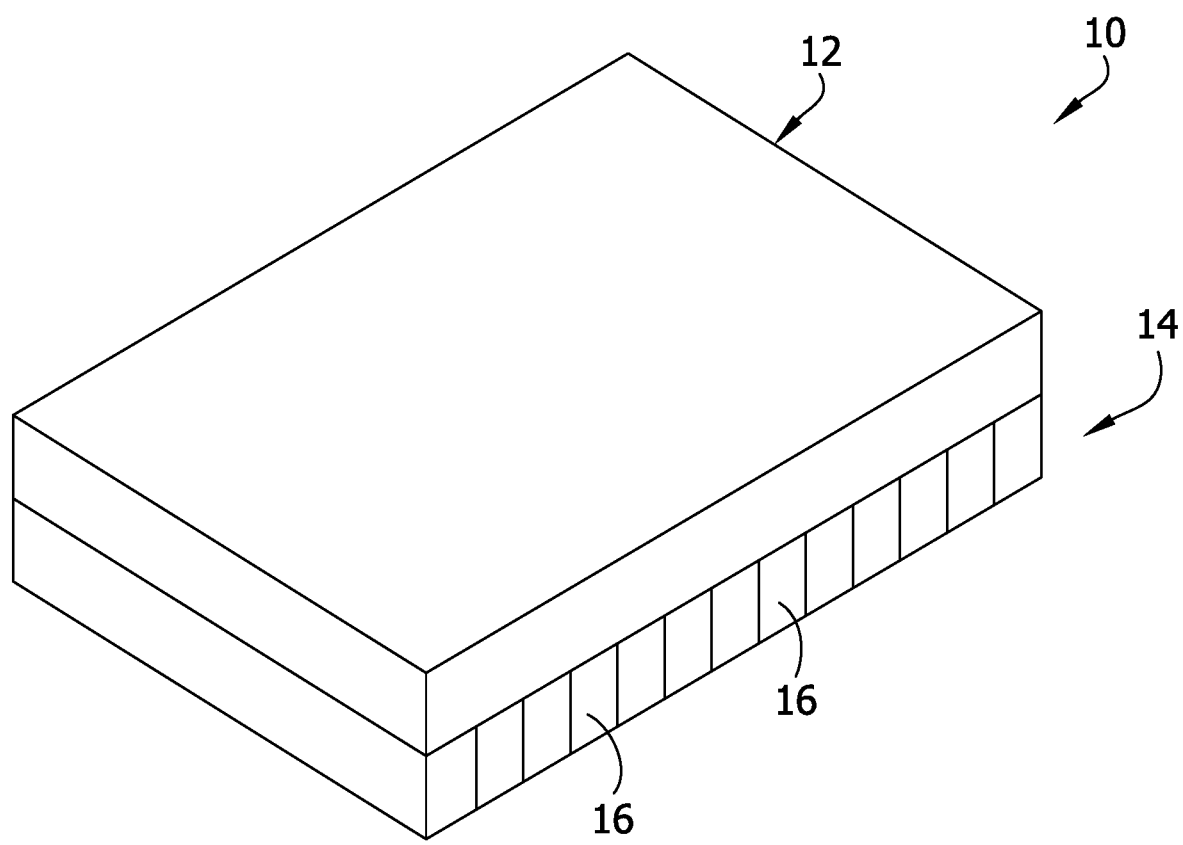
FIG. 2 is a perspective of a floor including a concrete layer poured into the concrete form of FIG. 1.
Figure 3:
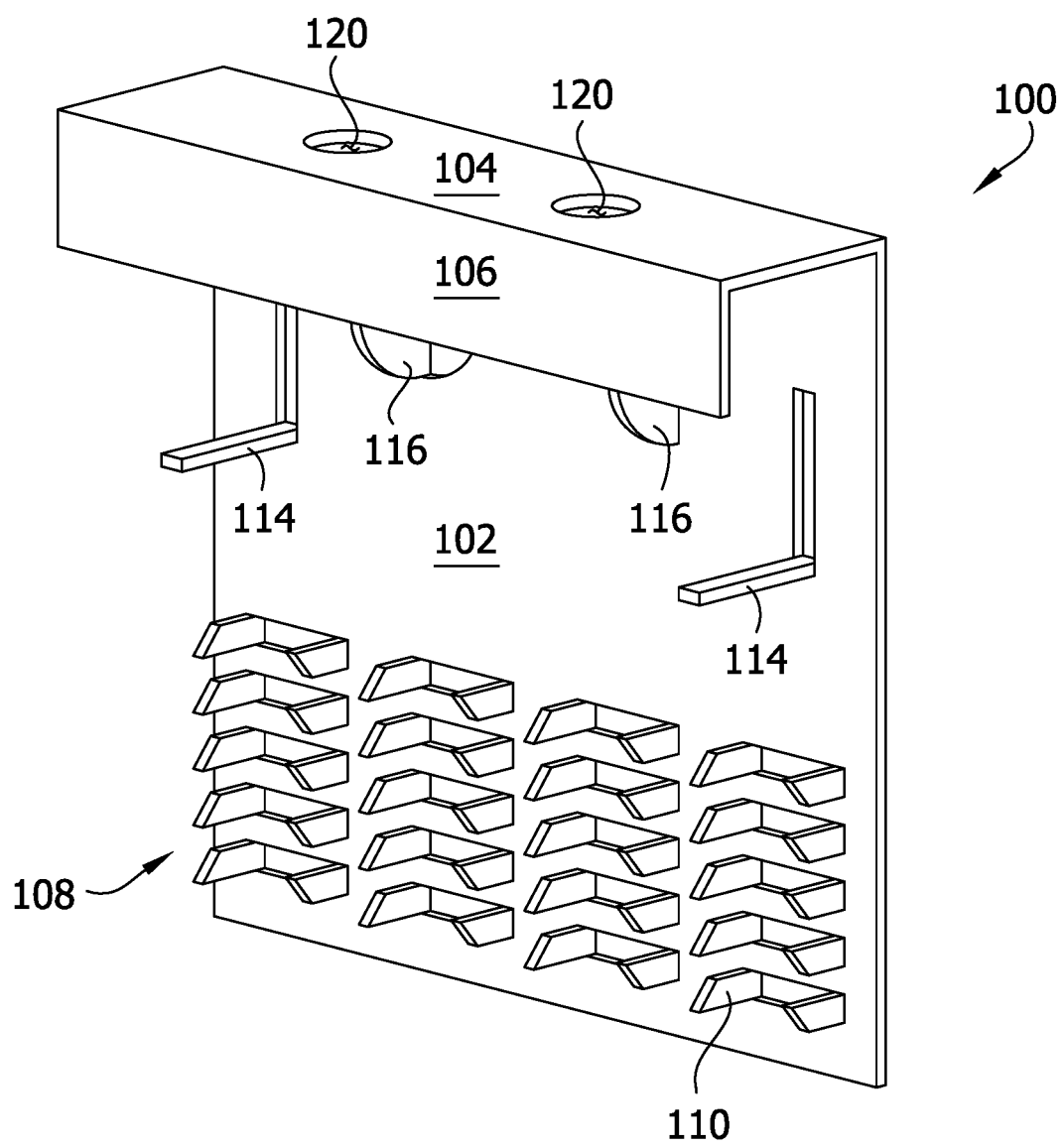
FIG. 3 is a perspective of the anchor.

Referring to FIGS. 1-3, one embodiment of an anchor for use in a floor, generally indicated at 10, of a building is generally indicated at 100. The floor 10 includes a concrete layer or floor, generally indicated at 12, and a wooden layer or sub-floor (broadly, a cellulosic layer), generally indicated at 14, supporting the concrete layer. The wooden sub-floor 14 is composed of a plurality of members (e.g., wooden members) 16 joined together in a side-by-side arrangement. Generally, the members 16 are made of a material capable of receiving and holding nails, nailing teeth, dowels and/or screws that are pressed or driven into the members. For example and without limitation, cellulosic material such as wood and bamboo may be used to form the members 16. In one embodiment, the members 16 are made of Douglas fir. The wooden members 16 may be joined in any suitable manner such as, but not limited to, by the use of screws, nails, dowels, and/or glue. The wooden members 16 have a generally uniform thickness. In one embodiment, the wooden members 16 have a thickness of approximately 2 inches (5 cm). As shown in FIG. 1, a plurality of anchors 100 are attached to and between the wooden members 16 and extend upward into the concrete layer, as explained in more detail below. The anchors 100 connect the concrete floor 12 to the wooden sub-floor 14 so that the floor and subfloor work cooperatively in load resistance. The anchors 100 may also be used to hold and position rebar 18 within the concrete floor 12. Other configurations of the floor are within the scope of the present disclosure.

Figure 11:
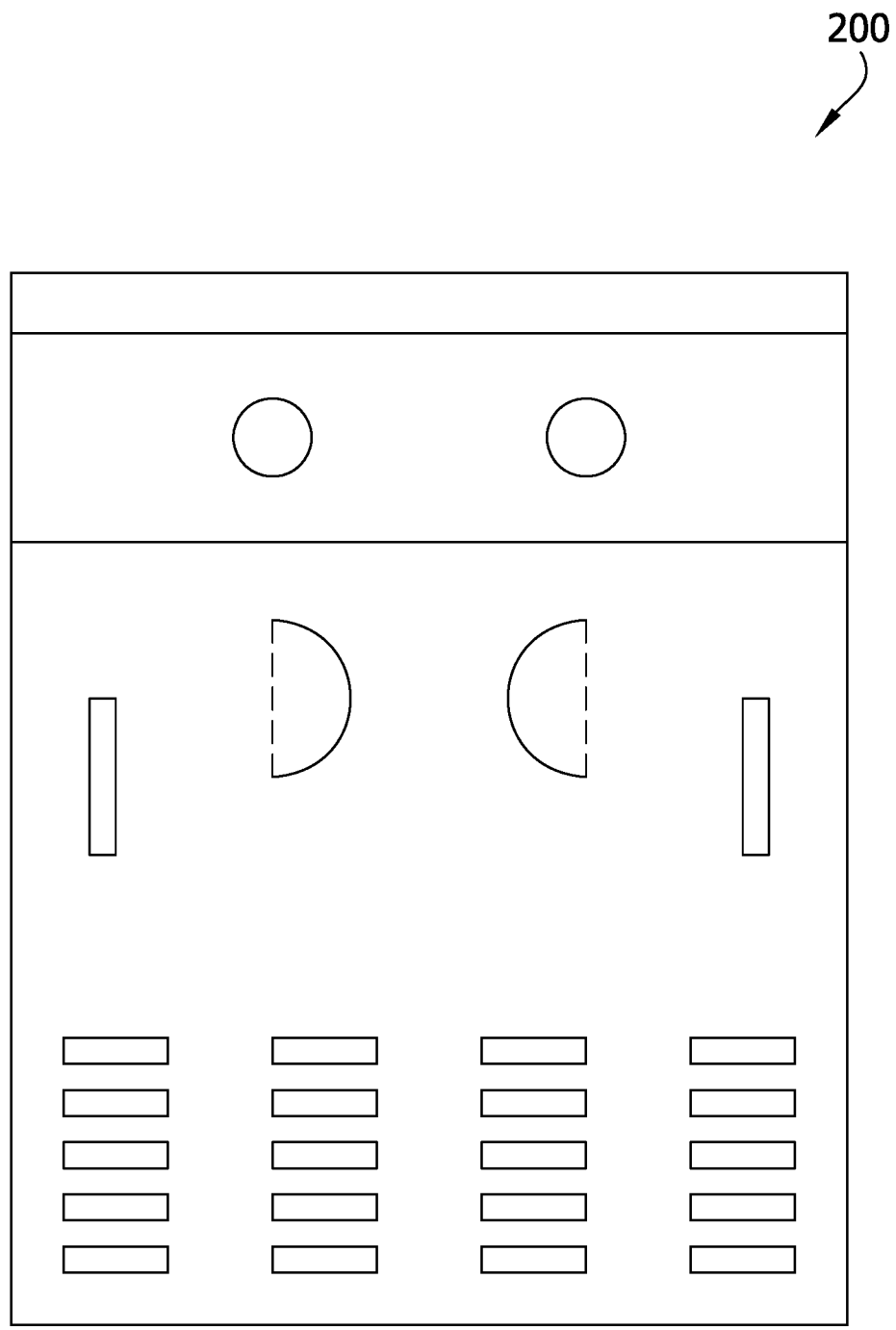
FIG. 11 is a top view of a metal blank used to form the anchor.

Referring to FIGS. 3-10, the anchor 100 configured to connect the concrete floor 12 to the wooden sub-floor 14 is shown. The anchor 100 includes a first portion 102, a second portion 104 and a third portion 106. The first, second, and third portions 102, 104, 106 are generally planar. The anchor 100 has a generally J-shape which is inverted when the anchor is attached to the wooden sub-floor 14. In the illustrated embodiment, the anchor 100 is formed as a unitary one-piece structure. In one embodiment, the anchor 100 is formed from a metal blank or template 200 cut from a single piece of material (FIG. 11) and bent (e.g., stamped) into shape. The anchor 100 can be formed from a piece of sheet metal or other suitable material. In one embodiment, the anchor 100 is stamped from 18 gauge steel, although other thicknesses (e.g., 10-20 gauge) and other suitable materials are within the scope of the present disclosure. Also, other configurations are within the scope of the present disclosure. For example, in one embodiment the portions of the anchor can be formed separately and attached together. As set forth below, in general the anchor 100 is configured to attach to the wooden sub-floor 14 and embed into the concrete floor 12 to connect the concrete floor and wooden sub-floor together. For convenience of description, the orientation of the anchor 100 in FIG. 3 provides the point of reference for the terms defining relative locations and positions of structures and components of the hanger, including but not limited to the terms "upper," "lower," "left," "right," "top," "bottom," "front," and back," as used throughout the present disclosure.

Referring still to FIGS. 3-10, the first portion 102 is generally rectangular and has opposite upper and lower edge margins, opposite left and right edge margins, a front face, and a back face. The lower, left and right edge margins are all free edge margins. The first portion 102 has a height extending between the upper and lower edge margins and a width extending between the left and right edge margins. In one embodiment, the height of the first portion 102 is about 3.75 inches (9.5 cm) and the width of the first portion is about 4 inches (10 cm). The first portion 102 is configured to be attached one of the wooden members 16 of the wooden sub-floor 14. Specifically, the first portion 102 is configured to be disposed between two adjacent wooden members and to attach to at least one of said two adjacent wooden members. When the first portion 102 is attached to one of the wooden members 16, the first portion 102 projects upward between two adjacent members of the wooden sub-floor 14 into the overlying concrete floor 12.

The first portion 102 includes attachment structure 108 configured to connect to the one of the wooden members 16. In the illustrated embodiment, the attachment structure 108 is a plurality of nailing teeth 110 extending from the first portion 102 in a forward direction. The nailing teeth 110 may be struck from the first portion 102 and bent into position. Other attachment structures such as, but not limited to one or more openings configured to receive a fastener (e.g., nail or screw), are within the scope of the present disclosure. The attachment structure 108 is configured to be disposed completely between the adjacent wooden members 16. Accordingly, the attachment structure 108 is adjacent to the lower edge margin of the first portion 102. In the illustrated embodiment, the plurality of nailing teeth 110 are arranged together in a nailing grouping, such as a grid pattern, the nailing grouping having a height that is less than the height of the wooden members 16 the anchor 100 is attached to. Specifically, the upper most nailing tooth 110 of the nailing grouping is disposed on the first portion 102 such that the upper most nailing tooth is disposed below the upper surface of the wooden sub-floor 14 when the anchor 100 is attached to the wooden sub-floor. Preferably, the nailing teeth 110 are disposed on the first portion 102 so that the nailing teeth are positioned at or near the middle of the wooden member 16 when the anchor 100 is secured thereon. In one embodiment, the attachment structure 108 includes forty nailing teeth spread out over the width of the first portion 102, although more or fewer nailing teeth, arranged in other ways are within the scope of the present disclosure. For example, a first portion (not shown) may be tall enough so as to extend from a bottom edge to the top edge of a side of a wooden member and have nailing teeth over substantially the full height of the wooden member.

The anchor 100 may include one or more locator tabs 114 (two are shown) configured to facilitate the positioning of the anchor on one of the wooden members 16 of the wooden sub-floor 14. Each locator tab 114 extends forward from the front face of the first portion 102 (e.g., extends in a direction that is normal or perpendicular to and away from the front face of the first portion). Each locator tab 114 is generally rectangular and has opposite left and right edge margins, opposite front and back edge margins, a top face, and a bottom face. The left, right and front edge margins are all free edge margins. The back edge margin of each locator tab 114 is integral or continuous with the front face of the first portion 102. Each locator tab 114 is generally perpendicular to the first portion 102. Each locator tab 114 has a length extending between the front and back edge margins and a width extending between the left and right edge margins. Preferably, the length of each locator tab 114 is longer than a length of the nailing teeth 110 so that the locator tabs 114 are able to engage the top surface of the wooden member 16 in order to position the anchor on the wooden member, as discussed in more detail below, before the nailing teeth are driven into the wooden member. In one embodiment, the length of each locator tab 114 is about 0.75 inch (2 cm) and the width of each locator tab is about 0.25 inches (0.6 cm). Each locator tab 114 may be stamped (e.g., struck and bent) from a portion of the first portion 102. Other configurations of the locator tab are within the scope of the present disclosure.

Figure 4:
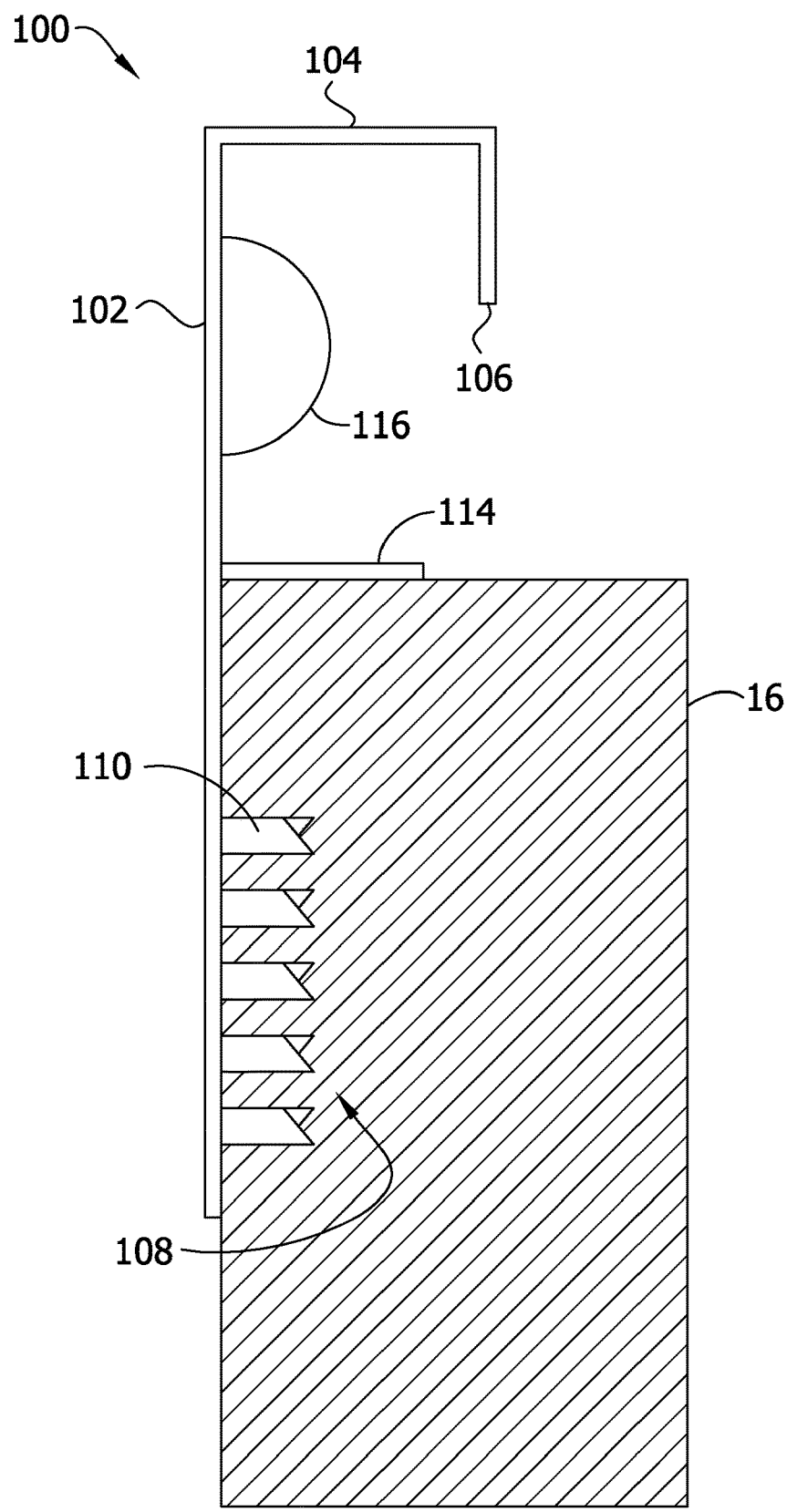
FIG. 4 is a left side view of the anchor attached to a wooden member of the wooden sub-floor shown in section.
Figure 5:
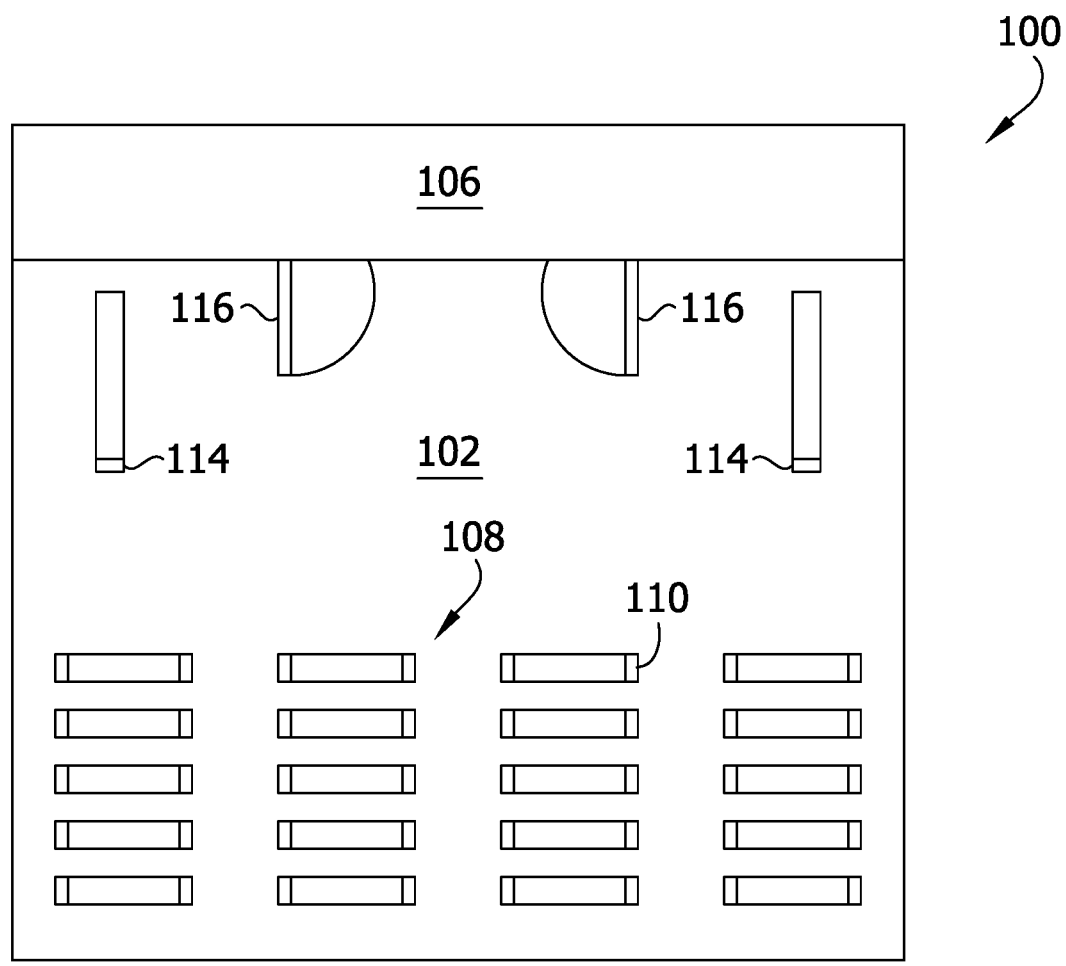
FIG. 5 is a front view of the anchor.
Figure 6:
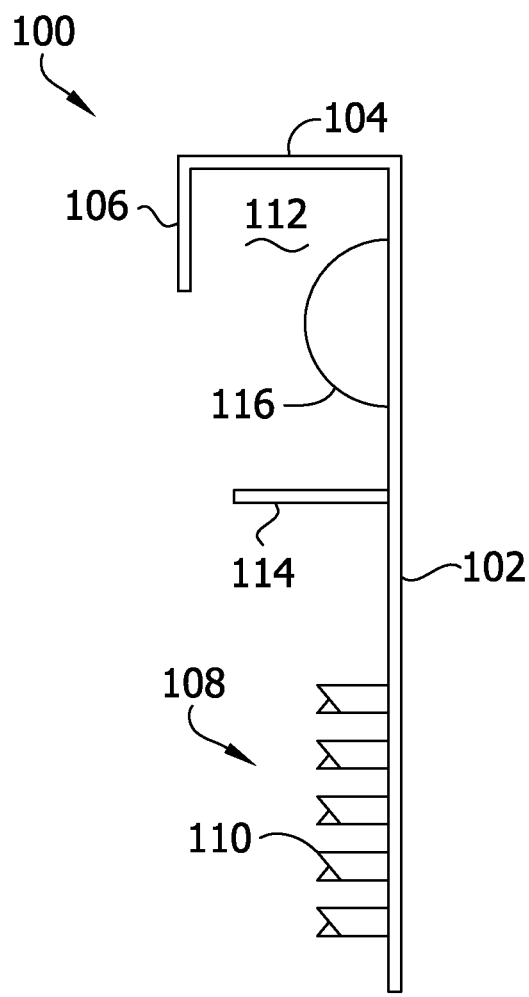
FIG. 6 is a right side view thereof.
Figure 7:
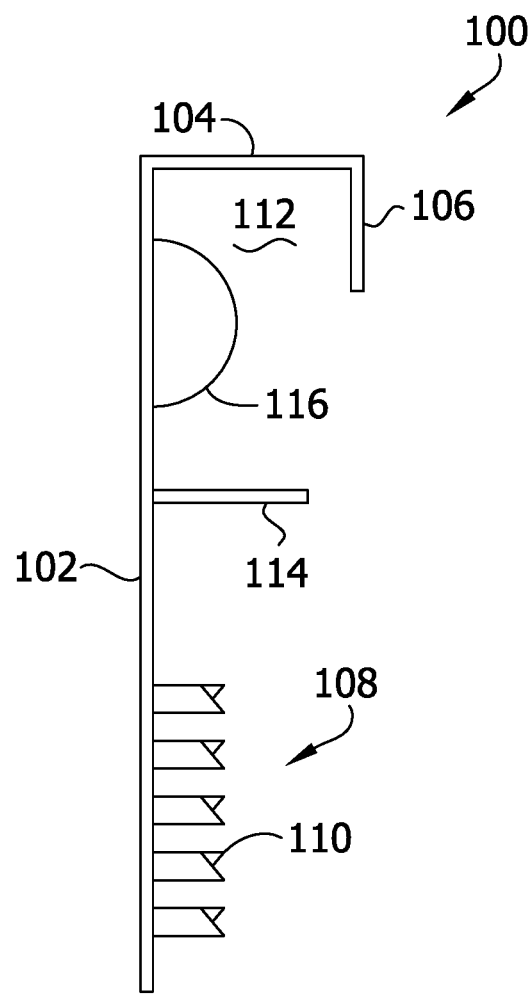
FIG. 7 is a left side view thereof.
Figure 8:
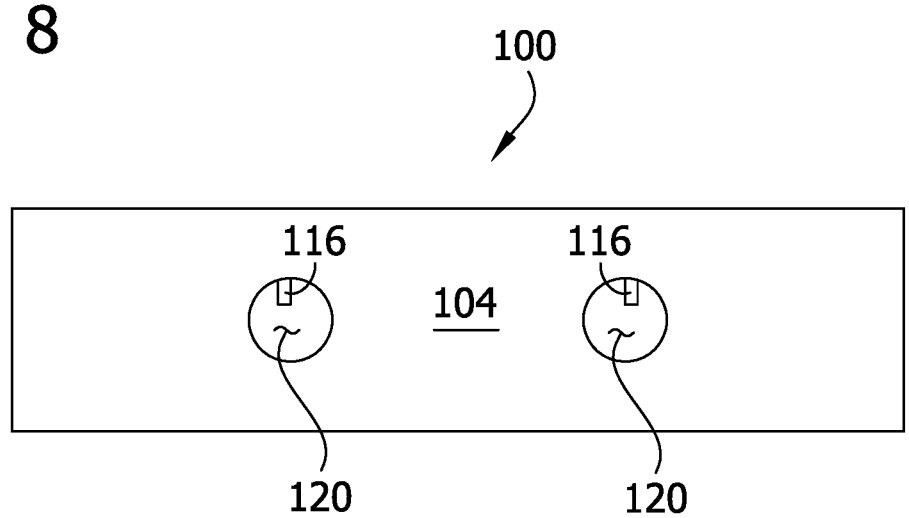
FIG. 8 is a top view thereof.
Figure 9:
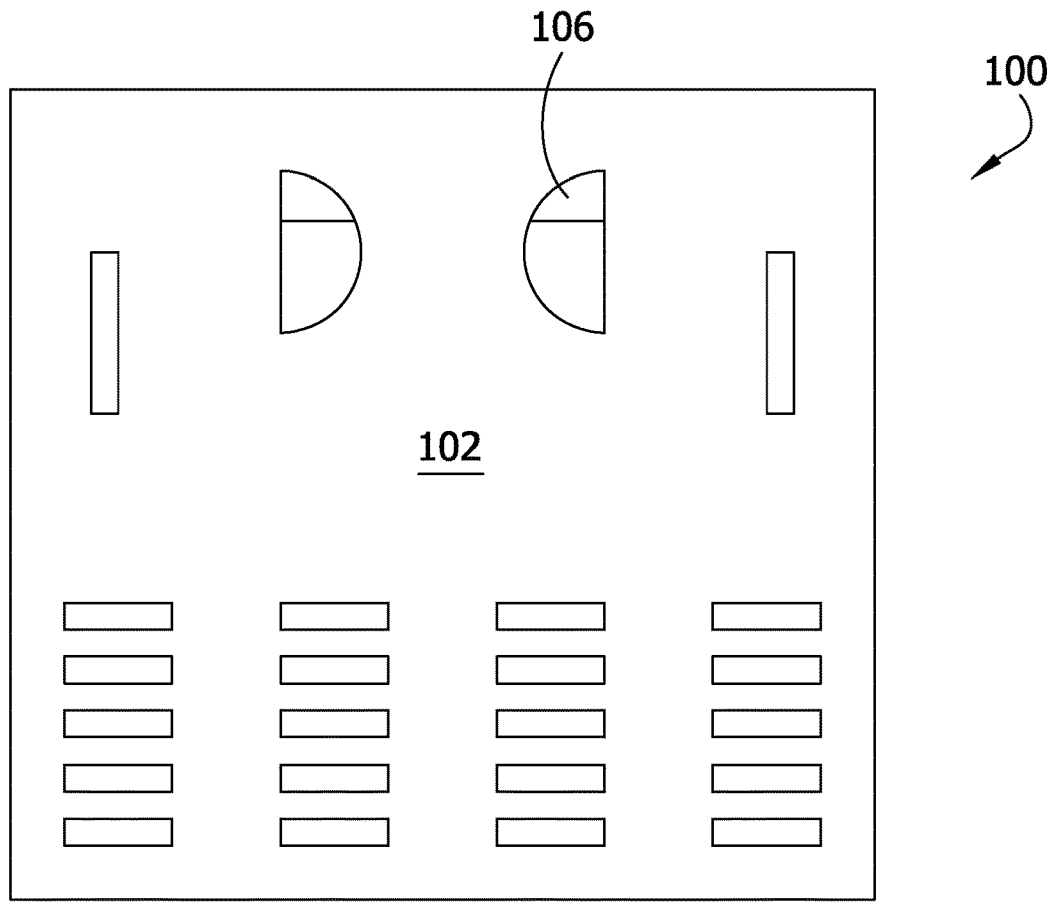
FIG. 9 is a rear view thereof.
Figure 10:
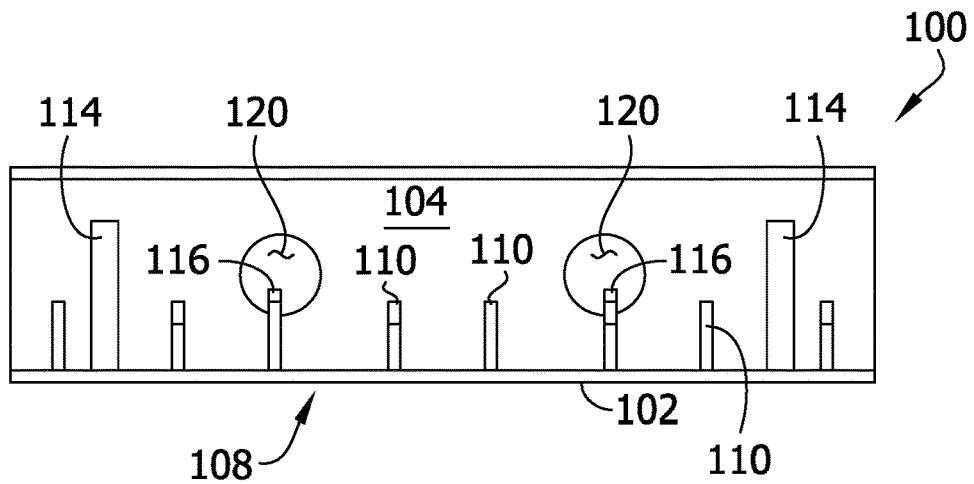
FIG. 10 is a bottom view thereof.

The locator tabs 114 are configured to position the anchor 100 on one of the wooden members 16 of the wooden sub-floor 14. The bottom face of each locator tab 114 is configured to engage the top surface of the wooden member 16 in order to position the anchor 100 at the correct height along the side of the wooden member the anchor is attached to. As shown in FIG. 4, when the locator tabs 114 engage the top surface of the wooden member 16 and the first portion 102 engages a side surface of the wooden member, the anchor 100 is disposed at the correct position (e.g., height) relative to the wooden sub-floor 14 and the nailing teeth are roughly centered on the side of the wooden member. In other words, the locator tabs 114 facilitate the positioning of the anchor 100 within the floor 10. As discussed in more detail below, the second and third portions 104, 106 are embedded (e.g., disposed) within the concrete floor 12 when the anchor 100 is in the correct portion relative to the wooden sub-floor 14.

Accordingly, the locator tabs 114 are disposed at a position intermediate of the upper and lower edge margins of the first portion 102. Preferably, the locator tabs 114 are disposed at a position near the middle between the upper and lower edge margins of the first portion 102. In one embodiment, the each locator tab 114 is spaced apart from the lower edge margin of the first portion 102 by a distance that is about 2.25 inches (5.7 cm). Thus, the one or more locator tabs 114 divide the first portion 102 into a lower section extending between the lower edge margin of the first portion and the locator tabs that is configured to be embedded in the wooden sub-floor (e.g., disposed between adjacent wooden members 16) and an upper section extending between the locator tabs and the upper edge margin of the first portion that is configured to be embedded in the concrete floor 12 (e.g., extend upward from the wooden sub-floor into the concrete floor). Accordingly, the attachment structure 108 is disposed completely within this lower section of the first portion 102 (e.g., the attachment structure is disposed between the lower edge margin of the first portion and the locator tabs 114) in order to attach to one of the wooden members 16.

The anchor 100 may also include one or more shear tabs 116 (two are illustrated) configured to strengthen the connection between the concrete floor 12 and wooden sub-floor 14 provided by the anchor. Specifically, the shear tabs 116 (broadly, tabs) are configured to increase the shear strength between the concrete floor 12 and the wooden sub-floor 14 provide by the anchor. Each shear tab 116 extends forward from the front face of the first portion 102. Each shear tab 116 is generally semi-circular and has opposite left and right faces, a back edge margin and an opposite arcuate (e.g., semi-circular) front edge margin. The front edge margin is a free edge margin. The back edge margin of each shear tab 116 is integral or continuous with the front face of the first portion 102. Each shear tab 116 is generally perpendicular to the first portion 102. Each shear tab 116 has a radius and, in one embodiment, the radius is about 0.375 inch (1 cm). Each shear tab 116 may be stamped (e.g., struck and bent) from a portion of the first portion 102. Other configurations and arrangements of the shear tab are within the scope of the present disclosure.

The one or more shear tabs 116 are configured to be embedded into the concrete floor 12 to increase the strength of the connection provided by the anchor 100 between the concrete floor and the wooden sub-floor 14. Accordingly, the shear tabs 116 are disposed within the upper section of the first portion 102 in order to be embedded within the concrete floor. In other words, the shear tabs 116 are disposed between the locator tabs 114 and the upper edge margin of the first portion 102. Preferably, the shear tabs 116 are disposed approximately half way between the locator tabs 114 and the upper edge margin of the first portion 102. When embedded in the concrete floor 12, the shear tabs 116 resist movement of the anchor 100 relative to the concrete floor. Specifically, the left and right faces of the shear tabs 116 engage the concrete floor 12 and prevent the anchor 100 from moving in a left and/or right direction relative to the concrete floor. The shear tabs 116 increase the surface area of the anchor 100 in profile that engages the concrete floor 12 to spread out the force applied to the concrete floor by the anchor when the anchor is subject to a force in the left and/or right directions. This additional surface area provided by the shear tabs 116 prevents the anchor 100 from cutting through and/or cracking the concrete floor 12. In a similar manner, the portions of the front and back faces in the upper section of the first portion 102 prevent the anchor 100 from moving in a front and/or back direction relative to the concrete floor 12.

Still referring to FIGS. 3-10, the second portion or flange 104 extends forward from the upper edge margin of the first portion 102 (i.e., extends transverse to the first portion). In the illustrated embodiment, the second portion 104 is generally rectangular and has opposite left and right edge margins, opposite front and back edge margins, a top face, and a bottom face. The left and right edge margins are both free edge margins. The back edge margin of the second portion 104 is integral or continuous with the upper edge margin of the first portion 102. The first and second portions 102, 104 are generally perpendicular to one another. The second portion 104 and locator tabs 114 are generally parallel to one another. The second portion 104 has a length extending between the front and back edge margins and a width extending between the left and right edge margins. Preferably, the width of the second portion 104 is the same as the width of the first portion 102. In one embodiment, the length of the second portion 104 is about 1 inch (2.5 cm) and the width of the second portion is about 4 inches (10 cm).

The second portion 104 is configured to be embedded in the concrete floor 12. When the anchor 100 is attached to the wooden sub-floor 14, the first portion 102 is configured to position the second portion 104 within the concrete floor 12 so that the concrete in the concrete floor surrounds the second portion. In other words, the first portion 102 has a height that is less than a height of the floor 10 (e.g., the combined height of the concrete floor 12 and wooden sub-floor 14) and, more particularly, has a height that positions the second portion between upper and lower surfaces of the concrete floor 12 when the anchor 100 is attached to the wooden sub-floor. Preferably, the first portion 102 is configured to position the second portion 104 at or near the middle of the concrete floor 12. The second portion 104 is configured to engage and support rebar 18 or other members within the concrete floor 12. As shown in FIG. 1, the second portion 104 can support rebar 18 within the concrete form 22 while the concrete is poured to form the concrete floor 12. The second portion 104 may include one or more openings 120 configured to receive a concrete tie (not shown) in order to secure the rebar 18 to the second portion 104.

The third portion or lip 106 extends downward (e.g., in a direction parallel to the front face and toward the lower edge margin of the first portion 102) from the front edge margin of the second portion 104, generally transverse to the second portion. In the illustrated embodiment, the third portion 106 is generally rectangular and has opposite left and right edge margins, opposite upper and lower edge margins, a front face, and a bottom face that faces the front face of the first portion 102. The lower, left and right edge margins are all free edge margins. The upper edge margin of the third portion 106 is integral or continuous with the front edge margin of the second portion 104. The third and second portions 106, 104 are generally perpendicular to one another. The third and first portions 106, 102 are generally parallel to one another. Thus, first and third portions 102, 106 lie in parallel and spaced apart planes. The third portion 106 has a height extending between the upper and lower edge margins and a width extending between the left and right edge margins. Preferably, the width of the third portion 106 is the same as the width of the first and second portions 102, 104. In one embodiment, the height of the third portion 106 is 0.25 inches (0.6 cm) or 0.5 inches (1.3 cm) and the width of the third portion is about 4 inches (10 cm).

As with the second portion 104, the third portion 106 is configured to be embedded in the concrete floor 12. Much like the second portion 104, when the anchor 100 is attached to the wooden sub-floor 14, the first portion 102 is configured to position the third portion 106 within the concrete floor 12 so that the concrete in the concrete floor surrounds the third portion. Thus, the height of the third portion 106 is less than the distance between the second portion 104 and the wooden sub-floor 14 and, preferably, significantly less so that the lower edge margin of the third portion is sufficiently spaced apart from the wooden sub-floor 14 to permit concrete to flow there-between. In one embodiment, when the anchor 10 is attached to the wooden member 16, the lower edge margin of the third portion 106 is spaced apart from the wooden member 16 by about 1.25 inches (3.2 cm). The first, second and third portions 102, 104, 106 define a receiving space or channel 112 (see, FIGS. 6 and 7) configured to receive concrete of the concrete floor 12 to secure the anchor 100 to the concrete floor. When the concrete is poured to form the concrete floor, the concrete flows around the third portion 106 and into the receiving space 112. Anchor 100 is believed to form a stronger connection with the concrete floor 12 over previous anchors because concrete is more likely to flow around the components of the anchor 100 into the large receiving space 112 than through the holes used in previous anchors. The third portion 106 adds a second 90 degree bend to the anchor 100, the first 90 degree bend being between the first and second portions 102, 104, to increase the strength of the connection between the anchor and the concrete floor 12 and prevent the anchor 100 from being pulled out of the concrete floor.

Referring to FIGS. 1, 2 and 4, in use, the one or more anchors 100 are used to connect the concrete floor 12 to the wooden sub-floor 14. The plurality of anchors 100 can be placed in to the wooden sub-floor 14 in any type of arrangement such as, but not limited to, a grid pattern as shown in FIG. 1. In one embodiment, the grid pattern is a one foot by one foot grid pattern, although other sizes are within the scope of the present disclosure. In one embodiment, the plurality of anchors 100 are randomly or otherwise non-uniformly arranged. Once the particular arrangement of the plurality of anchors 100 is determined, each anchor 100 is attached to the side of one of the wooden members 16. Each anchor 100 is arranged so that the attachment structure 108, more particularly the nailing teeth 110, overlie the side of the wooden member with the second and third portions 104, 106 disposed above the wooden member. If the anchor 100 includes locator tabs 114, the locator tabs are placed on the top surface of the wooden member 16 to position the anchor at the correct height on the wooden member. Once in position, the nailing teeth 110 of each anchor 100 are pressed into the side of the wooden member 16 to secure the anchor thereto. Each anchor 100 may be pressed into the wooden member 16 in any suitable manner such as, but not limited to, by a roller or other press. Other ways of attaching the first portion 102 to the wooden member 16 may be used within the scope of the present invention.

Once all the anchors 100 are secure to their respective wooden members 16, the wooden members are joined together in a side-by-side arrangement to form the wooden sub-floor 14, with each anchor extending above the wooden sub-floor. The concrete form 22 is then constructed above the wooden sub-floor and any reinforcement, such as rebar 18, is positioned therein (see, FIG. 1). The rebar 18 can be secured to the anchors 100 using ties (not shown) and the openings 120 in the second portions 104 of the anchors. Concrete is then poured over the wooden sub-floor 14 surrounding the portion of the anchors 100 above the wooden sub-floor to form the concrete floor 12. The concrete flows around the upper section of the first portion 102, the second portion 104, the third portion 106 and, if included, the shear tabs 116, embedding these components in the concrete floor 12. The concrete also flows into the receiving space 112. The concrete then cures over the wooden sub-floor and around the anchors 100 to form the concrete floor 12. In this manner, the anchors 100 unify or connect the concrete floor 12 to the wooden sub-floor 14. In one embodiment, the floor 10 is formed at a worksite or construction site, although it is contemplated that the floor can formed at a manufacturing facility and transported to the worksite.

Figure 12:
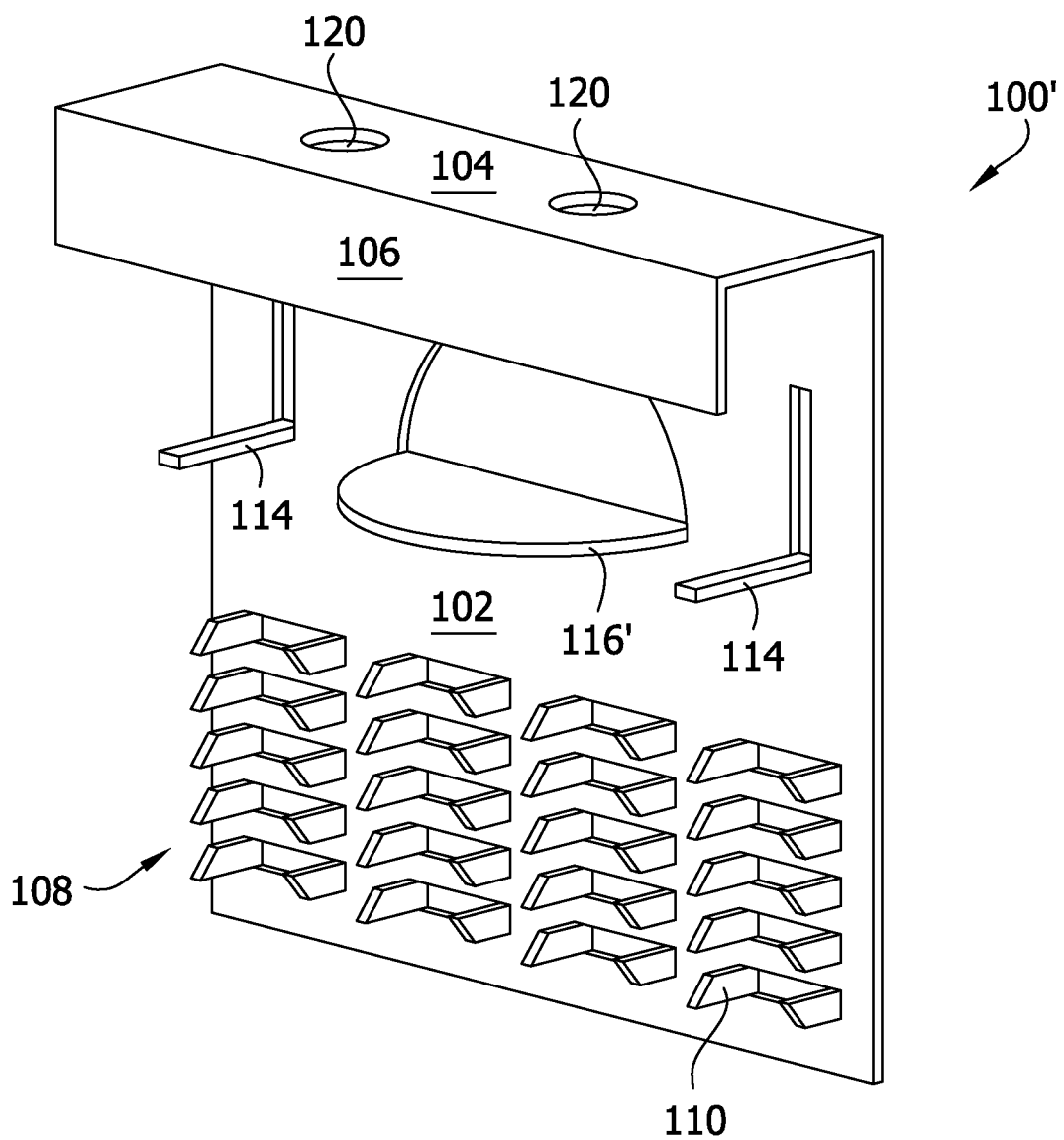
FIG. 12 is a perspective of another embodiment of an anchor.

Referring to FIG. 12, another embodiment of the anchor is generally indicated by reference numeral 100'. Anchor 100' is similar to anchor 100 and, thus, for ease of comprehension, where anchor 100' includes analogous or identical elements to that of anchor 100, identical reference numbers are used. Accordingly, it is understood that the description related to anchor 100 also applies to anchor 100'. The difference between anchors 100 and 100' is that anchor 100' includes a tab 116' (broadly, one or more) instead of shear tabs 116. However, in this configuration, the tab 116' is generally parallel to the second portion 104 (unlike, shear tabs 116 which are generally perpendicular to the second portion). Tab 116' is generally larger than shear tab 116 but is still generally perpendicular to the first portion 102. In one embodiment the tab 116' has a radius of about 0.75 inch (2 cm). Tab 116' is configured to be embedded within the concrete floor 12. However, in this embodiment, the tab 116' doubles functionally as a locator tab and is configured to position the anchor 100' on one of the wooden members 16 of the wooden sub-floor 14. The bottom face of the tab 116' is configured to engage the top surface of the wooden member 16 in order to position the anchor 100 at the correct height along the side of the wooden member the anchor is attached to. In this embodiment, the tab 116' is generally aligned (e.g., horizontally aligned) with the locator tabs 114. In other words, the tab 116' (broadly, at least one of the shear tabs) is generally co-planar with the locator tabs 114 (broadly, at least one of the locator tabs). Although the anchor 100' is shown with locator tabs 114 in this embodiment, it is understood that the anchor may not include the locator tabs. The top and bottom faces of the tab 116' engage the concrete floor 12 and the wooden sub-floor 14, respectively, to prevent the anchor 100' from moving vertically in the floor 10. In one embodiment, in addition to tab 116', the anchor 100' may also include one or more shear tabs 116.

Having described the invention in detail, it will be apparent that modifications and variations are possible without departing from the scope of the invention defined in the appended claims. For example, where specific dimensions are given, it will be understood that they are exemplary only and other dimensions are possible.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. An anchor for connecting a concrete layer of a floor to a cellulosic layer of the floor, the cellulosic layer comprising a plurality of cellulosic members joined together in a side-by-side arrangement, the anchor comprising:

a first portion having opposite upper and lower edge margins, the first portion configured to extend between two adjacent cellulosic members of the plurality of cellulosic members of the cellulosic layer into the concrete layer of the floor, the first portion including a plurality of spaced apart nailing teeth struck from the first portion and configured to attach the first portion to one of the two adjacent cellulosic members of the cellulosic layer to attach the anchor to the cellulosic layer, each nailing tooth of the plurality of nailing teeth pointing in the same direction such that the plurality of nailing teeth are configured to be driven into the same one of the two adjacent cellulosic members to attach the first portion to the cellulosic layer, the upper edge margin of the first portion configured to be disposed within the concrete layer when the first portion is attached to the cellulosic layer;

a second portion extending from the upper edge margin in a first direction that is transverse to the first portion, the second portion configured to be spaced apart from the cellulosic layer and embedded within the concrete layer of the floor to attach the anchor to the concrete layer; and further comprising a third portion extending from an edge margin of the second portion in a downward direction that is transverse to the second portion, the third portion being configured to be spaced apart from the cellulosic layer and embedded within the concrete layer of the floor to attach the anchor to the concrete layer.

2. The anchor as set forth in claim 1, wherein the first, second and third portions define a receiving space configured to receive a portion of the concrete layer to attach the anchor to the concrete layer.

3. The anchor as set forth in claim 2, further comprising one or more locator tabs extending from the first portion and configured to engage one of the two adjacent cellulosic members of the cellulosic layer the first portion extends between to position the first portion relative to said one cellulosic member.

4. The anchor as set forth in claim 3, further comprising one or more shear tabs extending from the first portion and configured to be embedded within the concrete layer of the floor.

5. The anchor as set forth in claim 4, wherein at least one of the one or more shear tabs is co-planar with at least one of the one or more locator tabs.

6. The anchor as set forth in claim 5, wherein the one or more shear tabs and one or more locator tabs extend from the first portion in the first direction.

7. The anchor as set forth in claim 4, wherein the the plurality of nailing teeth is disposed between the lower edge margin of the first portion and the one or more locator tabs and the one or more shear tabs are disposed between the upper edge margin of the first portion and the one or more locator tabs.

8. The anchor as set forth in claim 1, further comprising one or more locator tabs extending from the first portion and configured to engage one of the two adjacent cellulosic members of the cellulosic layer the first portion extends between to position the first portion relative to said one cellulosic member.

9. The anchor as set forth in claim 1, further comprising one or more shear tabs extending from the first portion and configured to be embedded within the concrete layer of the floor.

10. The anchor as set forth in claim 9, wherein the one or more shear tabs extend in the first direction that this generally transverse to the first portion.

11. The anchor as set forth in claim 1, wherein the second portion includes one or more openings configured to receive a concrete tie to secure rebar to the second portion.

12. The anchor as set forth in claim 1, in combination with the cellulosic layer.

13. The anchor as set forth in claim 12, in combination with the concrete layer.

14. A method of making an anchor that connects a concrete layer of a floor to a cellulosic layer of the floor, the cellulosic layer comprising a plurality of cellulosic members joined together in a side-by-side arrangement, the method comprising:

cutting an anchor blank from a sheet of material;

forming a first portion from the anchor blank, the first portion having opposite upper and lower edge margins and configured to extend between two adjacent cellulosic members of the plurality of cellulosic members of the cellulosic layer into the concrete layer of the floor, the first portion having a surface lying generally in a plane;

forming an attachment structure on the first portion, the attachment structure configured to attach the first portion to one of the two adjacent cellulosic members to attach the anchor to the cellulosic layer, the upper edge margin of the first portion configured to be disposed within the concrete layer when the first portion is attached to the cellulosic layer;

forming at least one shear tab within the first portion projecting transversely to the surface of the first portion lying generally in the plane, the shear tab being located with respect to the attachment structure for disposition in the concrete when the anchor is attached to said one of the cellulosic members;

forming a second portion from the anchor blank, the second portion extending from the upper edge margin in a first direction that is transverse to the first portion, the second portion configured to be spaced apart from the cellulosic layer and embedded within the concrete layer of the floor to attach the anchor to the concrete layer; and further comprising forming a third portion from the anchor blank, the third portion extending from an edge margin of the second portion in a downward direction that is transverse to the second portion, the third portion being configured to be spaced apart from the cellulosic layer and embedded within the concrete layer of the floor to attach the anchor to the concrete layer.

15. The method of claim 14, further comprising forming one or more locator tabs from the anchor blank, the one or more locator tabs extending from the first portion and configured to engage one of the two adjacent cellulosic members of the cellulosic layer the first portion extends between to position the first portion relative to said one cellulosic member.

16. The method of claim 14, wherein forming the at least one shear tab comprises striking said at least one shear tab from the anchor blank, said at least one shear tab extending from the first portion and configured to be embedded within the concrete layer of the floor.

17. An anchor for connecting a concrete layer of a floor to a cellulosic layer of the floor, the cellulosic layer comprising a plurality of cellulosic members joined together in a side-by-side arrangement, the anchor comprising:

a first portion having opposite upper and lower edge margins, the first portion configured to extend between two adjacent cellulosic members of the plurality of cellulosic members of the cellulosic layer into the concrete layer of the floor, the first portion including attachment structure configured to attach the first portion to one of the two adjacent cellulosic members of the cellulosic layer to attach the anchor to the cellulosic layer, the upper edge margin of the first portion configured to be disposed within the concrete layer when the first portion is attached to the cellulosic layer;

a second portion extending from the upper edge margin in a first direction that is transverse to the first portion, the second portion configured to be spaced apart from the cellulosic layer and embedded within the concrete layer of the floor to attach the anchor to the concrete layer; and a third portion extending from an edge margin of the second portion in a downward direction that is transverse to the second portion, the third portion being configured to be spaced apart from the cellulosic layer and embedded within the concrete layer of the floor to attach the anchor to the concrete layer.

18. The anchor of claim 17, wherein the first and third portions are generally parallel to each other.

\* \* \* \* \*